United States Patent
Doherty et al.

(10) Patent No.: US 9,123,340 B2
(45) Date of Patent: Sep. 1, 2015

(54) DETECTING THE END OF A USER QUESTION

(71) Applicants: Ryan P. Doherty, San Jose, CA (US); Nicholas Johnston, San Jose, CA (US)

(72) Inventors: Ryan P. Doherty, San Jose, CA (US); Nicholas Johnston, San Jose, CA (US)

(73) Assignee: Google Inc., Mountain View, CA (US)

( * ) Notice: Subject to any disclaimer, the term of this patent is extended or adjusted under 35 U.S.C. 154(b) by 231 days.

(21) Appl. No.: 13/781,853

(22) Filed: Mar. 1, 2013

(65) Prior Publication Data
US 2014/0249811 A1    Sep. 4, 2014

(51) Int. Cl.
| | | |
|---|---|---|
| G10L 15/00 | (2013.01) | |
| G10L 21/00 | (2013.01) | |
| G10L 15/22 | (2006.01) | |
| G06K 9/00 | (2006.01) | |

(52) U.S. Cl.
CPC ............ G10L 15/22 (2013.01); *G06K 9/00335* (2013.01); *G10L 2015/226* (2013.01)

(58) Field of Classification Search
None
See application file for complete search history.

(56) References Cited

U.S. PATENT DOCUMENTS

| | | | |
|---|---|---|---|
| 6,567,775 B1 | 5/2003 | Maali et al. | |
| 7,349,850 B2 * | 3/2008 | Shimomura et al. | 704/270 |
| 7,660,715 B1 * | 2/2010 | Thambiratnam | 704/244 |
| 7,716,057 B2 | 5/2010 | Horvitz | |
| 7,983,906 B2 * | 7/2011 | Gao et al. | 704/215 |
| 8,190,431 B2 * | 5/2012 | Sannerud | 704/251 |
| 8,457,966 B2 * | 6/2013 | Sannerud | 704/251 |
| 8,793,136 B2 * | 7/2014 | Cho et al. | 704/275 |
| 8,793,138 B2 * | 7/2014 | Cho et al. | 704/275 |
| 8,874,448 B1 * | 10/2014 | Kauffmann et al. | 704/278 |
| 2002/0105575 A1 | 8/2002 | Hinde et al. | |
| 2003/0154084 A1 | 8/2003 | Li et al. | |
| 2003/0236663 A1 | 12/2003 | Dimitrova et al. | |
| 2009/0112590 A1 | 4/2009 | Pulz et al. | |
| 2010/0106495 A1 | 4/2010 | Iwasawa | |
| 2010/0161334 A1 | 6/2010 | Kang et al. | |
| 2010/0235341 A1 | 9/2010 | Bennett et al. | |
| 2012/0089392 A1 * | 4/2012 | Larco et al. | 704/231 |
| 2012/0259638 A1 | 10/2012 | Kalinli | |
| 2013/0013316 A1 | 1/2013 | Burke et al. | |
| 2014/0006033 A1 * | 1/2014 | Jung et al. | 704/275 |
| 2014/0288931 A1 * | 9/2014 | Cho et al. | 704/246 |

OTHER PUBLICATIONS

"Get Inside your Favorite Movies with Google Play," Android Official Blog, Mar. 27, 2013, 1 page.
Bendris, Meriem et al. "Lip Activity Detection for Talking Faces Classification in TV-Content," 2010 The 3rd International Conference on Machine Vision (ICMF 2010), 5 pages.

(Continued)

*Primary Examiner* — Satwant Singh
(74) *Attorney, Agent, or Firm* — Fish & Richardson P.C.

(57) ABSTRACT

Methods, systems, and apparatus, including computer programs encoded on a computer storage medium, for classifying voice inputs. The methods, systems, and apparatus include actions of providing an answer to a first voice input from a user and receiving visual or audio data corresponding to a second voice input. Further actions include classifying the second voice input as a follow on request to the first voice input or as deliberation on the answer, based on the visual data or the audio data. Additionally, the actions include determining whether to provide a response to the second voice input based on the classification of the second voice input.

19 Claims, 4 Drawing Sheets

(56) References Cited

OTHER PUBLICATIONS

Patel, Nilesh V. et al., "Video Classification Using Speaker Identification," SPIE Proceedings: Storage and Retrieval for Image and Video Databases, V, 218 (Jan. 15, 1997), 8 pages.

Siatras, Spyridon et al., "Visual Lip Activity Detection and Speaker Detection Using Mouth Region Intensities," Circuits and Systems for Video Technology, IEEE Transaction, Jan. 2009, 5 pages.

Viola, Paul et al., "Rapid Object Detection Using a Boosted Cascade of Simple Features," Proceedings of the 2001 IEEE Computer Society Conference on Computer Vision and Pattern Recognition, 2001, 9 pages.

International Search Report and Written Opinion in International Application No. PCT/US2014/014236, mailed Apr. 30, 2014, 10 pages.

* cited by examiner

DETECTING THE END OF A USER QUESTION

TECHNICAL FIELD

The description relates to controlling computers using voice commands.

BACKGROUND

Utterances of users may be analyzed to determine actions for computers to perform in response. For example, a user may utter "What time is it?" and a computer may provide a response, "It is 4:30 PM."

SUMMARY

In general, an aspect of the subject matter described in this specification may involve a process for a voice-control enabled system to classify a voice input as a follow on request directed at the system or as a deliberation on an answer that is not directed to the system. The system can recognize that the user is no longer addressing the system, e.g., a voice input is classified as deliberation, and avoid performing unnecessary actions based on utterances from people while they are deliberating.

In some aspect, the subject matter described in the specification may be embodied in methods that include the actions of providing an answer to a first voice input from a user and receiving visual or audio data corresponding to a second voice input. Further actions include classifying the second voice input as a follow on request to the first voice input or as deliberation on the answer, based on the visual data or the audio data. Additionally, the actions include determining whether to provide a response to the second voice input based on the classification of the second voice input.

Other versions include corresponding systems, apparatus, and computer programs, configured to perform the actions of the methods, encoded on computer storage devices. These and other versions may each optionally include one or more of the following features.

For instance, in some implementations the actions further include receiving visual or audio data corresponding to the first voice input and entering an active listen mode based on the visual or audio data corresponding to the first voice input, where determining whether to provide the response to the second voice input includes exiting the entered active listen mode if the second voice input is classified as deliberation.

In certain aspects, the actions further include determining an angle of the user's head, where classifying the second voice input as a follow on request to the first voice input or deliberation on the answer is based on the determined angle of the user's head.

In some implementations, further actions include determining a number of people in an area that includes the user based on the visual data, where classifying the second voice input as a follow on request to the first voice input or deliberation on the answer is based on the determined number of people.

In some aspects, additional actions include determining whether the lips of the user are moving based on the visual data, where classifying the second voice input as a follow on request to the first voice input or deliberation on the answer is based on the determination if lips of the user are moving.

In certain aspects, the actions further include determining words corresponding to the second voice input based on the audio data, where classifying the second voice input as a follow on request to the first voice input or deliberation on the answer is based on the determined words of the second voice input.

In some implementations, the response includes an answer to the second voice input or a reaction to the second voice input perceivable by the user.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers refer to like elements.

DETAILED DESCRIPTION

A voice-control enabled system that performs actions based on utterances may have trouble determining when to stop listening to a user. For example, a system may have difficulty detecting when people stop addressing the system and start deliberating amongst themselves. There may be times where a person initially is directing questions towards the system, but then directs questions to others, or hears statements or questions from other people who also hear the response from the system. For example, a person may ask the system what movies are playing tonight. The system may provide a response, and the person may then ask others (or others may ask the person) which movie they want to watch based on the system's response. The person may then ask the system another question, for example, what movies are playing at other theaters.

The period of time after a user receives a response from the system, but before the user asks the system another question (e.g., during which the user and others are talking amongst themselves) may be considered a deliberation period. If the system can recognize that it is no longer being addressed, e.g., a voice input is classified as deliberation, the system can avoid performing unnecessary actions based on utterances from people while they are deliberating.

Figure 1:
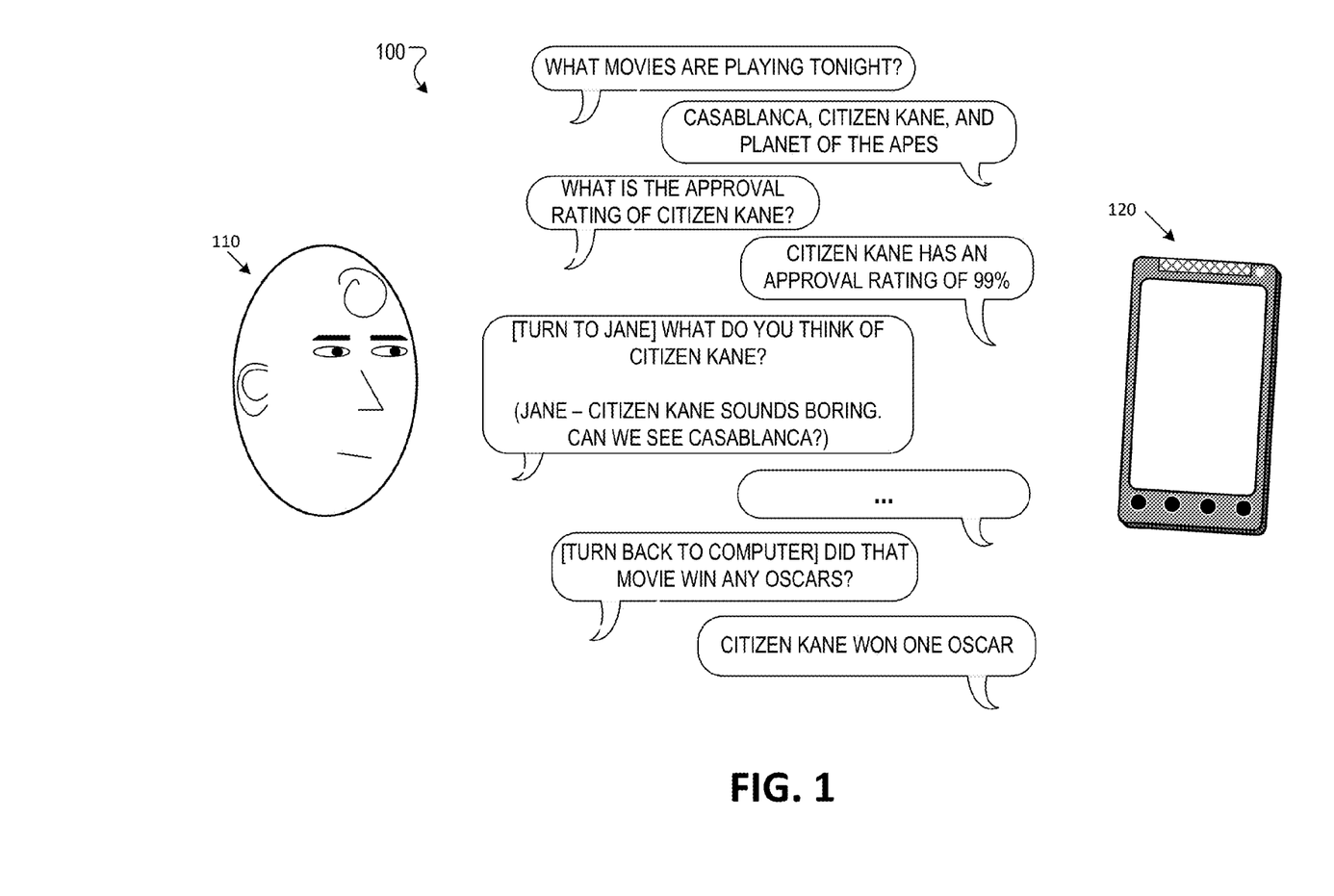
FIG. 1 illustrates an example interaction between a user and a system.

FIG. 1 illustrates an example interaction 100 between a user 110 and the system 120. The system 120 may receive audio and visual data correspond to voice input and determine what, if any action, the system 120 should take in response to the voice input. For example, the user 110 may look at the system 120 and provide voice input by uttering the phrase, "What movies are playing tonight?"

The system 120 may transcribe the voice input using speech to text recognition and perform a search using the transcription to determine an answer to the user's question. For example, the system 120 may determine that Casablanca, Citizen Kane, and Planet of the Apes are playing tonight and provide the response, "Casablanca, Citizen Kane, and Planet of the Apes." The system 120 may provide the response as a visual response on a display of the system 120 or as an audio response using a speaker of the system 120, or as a combination of visual or audio responses.

The user 110 may then provide further voice input by uttering the phrase, "What is the approval rating of Citizen Kane?" The system 120 may receive audio and visual data corresponding to the voice input and classify the voice input as a follow on request to the previous voice input based on the received audio and visual data. For example, the system 120 may determine that the user's face is angled towards the system 120, the user's lips are moving, the voice is the user's voice, and that the voice input is a question of a type that is typically directed towards the system 120. The system 120 may determine to provide a response based on the classification that the voice input is a follow on request to the previous voice input. The system 120 may provide the response, "Citizen Kane has an approval rating of 99%."

The user 110 may then turn the user's head away from the system 120 towards another person in the area, e.g., a person named Jane, and ask the person the question, "What do you think of Citizen Kane?" Even though the user 110 intended the question for the other person, the system 120 may still receive the utterance for the question as voice input. The system 120 may receive audio and visual data corresponding to the voice input and determine that the voice input is deliberation on the previous answer the system 120 provided. For example, system 120 may determine that the user's head is angled away from the system 120 towards another person in the area and that the question from the user is of a type that the system 120 does not typically respond. Based on the determination of the voice input as deliberation, the system 120 may determine not to provide a response to the voice input.

The other person may provide a response to the user's question. For example, Jane may provide the response, "Citizen Kane sounds boring. Can we see Casablanca?" The system 120 may also receive the utterances from Jane as voice input. Based on the audio and visual data, the system 120 may also classify the voice input from Jane as deliberation. For example, the system 120 may determine that voice input is coming from another person that is not identified as the user 110, the other person's head is not facing the system 120, and that the voice input is not a question of the type that the system 120 typically responds to.

The user 110 may not wish to watch Casablanca and in an attempt to convince Jane to watch Citizen Kane, may turn back to face the system 120 and ask the question, "Did that movie win any Oscars?" The system 120 may receive audio and visual input and classify the voice input as a follow on request to the answer that the system 120 previously provided. For example, the system 120 may classify the voice input as a follow request based on the visual or audio data indicating that the user 110 is facing the system 120, the user's lips are moving, and the question is of a type that the system 120 typically responds to.

The system 120 may determine that "that movie" is referring to the movie that the system 120 previously provided an answer for. The system 120 may determine that the last answer was for Citizen Kane, and that the user 110 is asking if Citizen Kane has won any Oscars. In response, the system 120 may determine that Citizen Kane has won one Oscar, and provide the response, "Citizen Kane won one Oscar."

Figure 2:
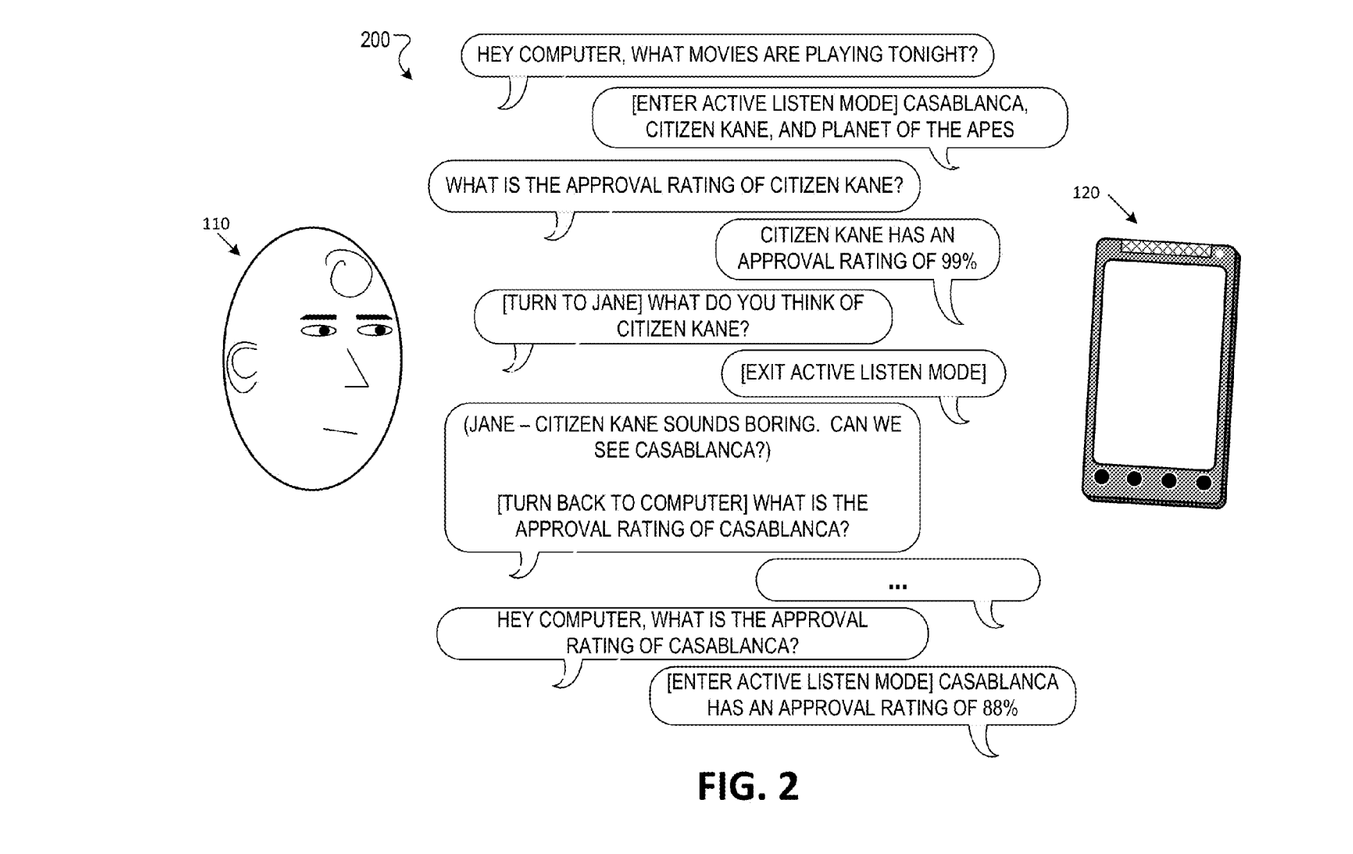
FIG. 2 illustrates another example interaction between a user and a system.

FIG. 2 illustrates another example interaction 200 between a user 110 and the system 120. The interaction 200 may be similar to interaction 100, although the system 120 may also include an active listen mode. In the active listen mode, the system 120 may respond to voice inputs. When the system 120 is not in the active listen mode, the system 120 may determine not to respond to any voice input or may weight against responding to voice inputs. For example, in the active listen mode the system 120 may classify the user 110 as facing the system 120 if the user's head is facing within twenty degrees of the line between the user 110 and the system 120, but while not in the active listen mode, the system 120 may reduce the twenty degrees to ten degrees.

Users may explicitly instruct the system 120 to enter the active listen mode. For example, the user 110 may begin an utterance with "Hey computer" as an explicit instruction to enter the active listen mode. The system 120 may remain in the active listen mode for a pre-determined length of time from entering the active listen mode, until a pre-determined length of time has lapsed since the system 120 last provided a response to a voice input, or until the system 120 classifies a voice input as deliberation.

In the interaction 200, the user 110 may provide the voice input, "Hey computer, what movies are playing tonight." The system 120 may detect the phrase "Hey computer" at the beginning of the utterance and enter the active listen mode. Similarly to as described for the interaction 100 in FIG. 1, the system 120 may provide the response, "Casablanca, Citizen Kane, and Planet of the Apes," the user 110 may utter, "What is the approval rating of Citizen Kane," the system 120 may provide the response, "Citizen Kane has an approval rating of 99%," the user 110 may turn to another person and utter, "What do you think of Citizen Kane," and the system 120 may classify the voice input as deliberation.

The system 120 may determine to exit the active listen mode based on classifying the voice input as deliberation. Accordingly, the system 120 may choose not to respond to any voice input until the system 120 detects an explicit instruction to enter the active listen mode. The other user may utter, "Citizen Kane sounds boring. Can we see Casablanca?" and the user 110 may turn back to the system 120 and utter, "What is the approval rating of Casablanca?" The system 120 may choose not to respond to any of these utterances based on not being in the active listen mode.

The user 110 may realize that the system 120 is no longer in the active listen mode and repeat the original request along with the explicit instruction to enter the active listen mode. For example, the user 110 may utter, "Hey computer, what is the approval rating of Casablanca." The system 120 may detect the phrase "Hey computer," enter the active listen mode based on the detection, and provide the response, "Casablanca has an approval rating of 88%."

Figure 3:
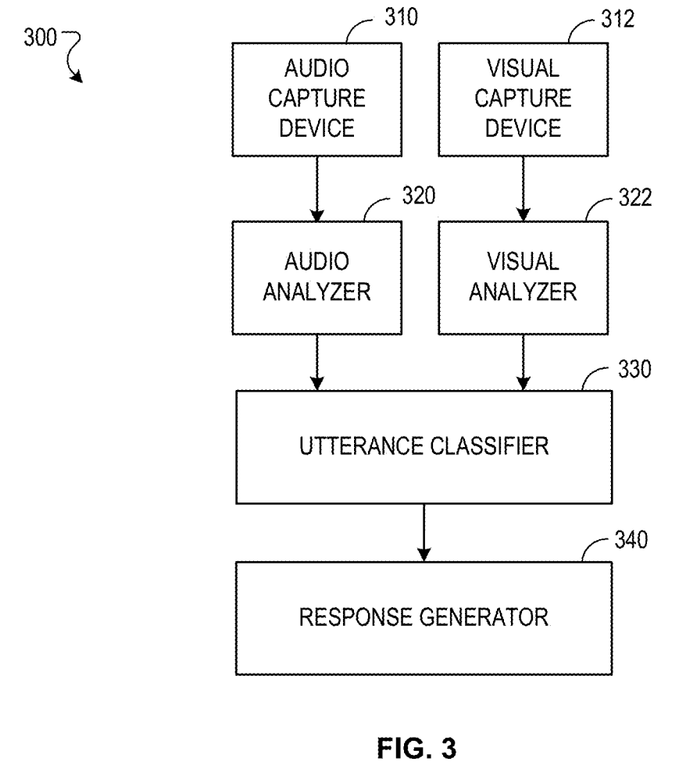
FIG. 3 illustrates an example block diagram of a system.

FIG. 3 illustrates an example block diagram of the system 120. The system 120 may include an audio capture device 310, an audio analyzer 320, a visual capture device 312, a visual analyzer 322, an utterance classifier 330, and a response generator 340. The audio capture device 310 may be a device that captures audio as audio data. For example, the audio capture device 310 may be a device that converts acoustic sounds into electronic signals, e.g., a microphone.

The audio analyzer 320 may analyze audio data. For example, the audio analyzer 320 may perform speech to text transcription to determine the words that correspond to the voice input from the user 110 and to determine if the voice input is a question. The audio analyzer 320 may perform voice identification to determine the identity of the person that the voice input is from. While one audio capture device 310 is shown, the system 120 may also use multiple audio capture devices. Use of multiple audio capture devices may allow the audio analyzer 320 to determine the direction that the voice input came from based on differences between the audio data captured by each of the multiple audio capture devices.

The visual capture device 312 may be a device that captures visuals as visual data. For example, the visual capture device 312 may be a digital video recorder, a digital camera, a webcam, etc. The visual capture device 312 may capture visuals and represent the visuals as a stream of images that may form a video.

The visual analyzer 322 may analyze the visual data. For example, the visual analyzer 322 may determine the number of people in an area represented by the visual data, the identity of the people, the vertical and horizontal angles of the heads of the people, and lip movement of people. While one video capture device 312 is shown, the system 120 may also use multiple video capture devices. Use of multiple video capture devices may allow the video analyzer 322 to better make determinations, e.g., people obstructed from the view of one capture device may be seen in the view of another capture device.

The visual analyzer 322 and audio analyzer 320 may work in combination to analyze audio and visual data. For example, the visual analyzer 322 and audio analyzer 320 may determine the identity of the person providing the voice input based on the lip movement of people and the acoustic characteristics of the voice.

The utterance classifier 330 may classify voice input as a follow on request to previous voice input or as deliberation on the answer based on the visual data or the audio data. The utterance classifier 330 may generally classify voice input as a follow on request if the same speaker is speaking, is looking at the system 120, and is providing voice input to which the system 120 typically provides a response.

Specifically, the utterance classifier 330 may classify the voice input based on multiple factors. The factors may include the user's head, the number of people in an area that includes the user based on the visual data, whether the lips of the user are moving, whether the words corresponding to the voice input correspond to an input the system 120 typically responds to, and the identity of the user. For example, the utterance classifier 330 may be more likely to classify the voice input as a follow on request if the user's head is angled towards the system 120, there are fewer people in the area that includes the user 110, the lips of the user 110 are moving, the words correspond to input the system 120 typically responds to, and the identity of the user 110 is the same user for which an answer was previously provided.

The response generator 340 may provide responses to voice input based on the classification of the voice input made by the utterance classifier 330. For example, the response generator 340 may only provide a response if the utterance classifier 330 determines that a voice input is a request for the system 120 or a follow on request to a voice input that was a request for the system 120. Accordingly, the response generator 340 may determine not to respond to the voice input if the voice input is classified as deliberation.

When the voice input is a question for the response generator 340, the response generator 340 may obtain an answer to the question and provide the answer to the user 110. For example, the response generator 340 may include a search engine that searches for an answer to the question or may request an answer from a separate search engine.

When a second voice input is classified as a follow on request to a first voice input that was a request for the system 120, the response generator 340 may ignore all intervening voice inputs when generating a response to the second voice input. For example, if the system 120 provides a response regarding Citizen Kane and receives a voice input regarding Casablanca that is classified as a deliberation, the response generator 340 may receive a request, "Did that movie win any Oscars?" and determine that "that movie" corresponds to Citizen Kane by ignoring the voice input regarding Casablanca.

Figure 4:
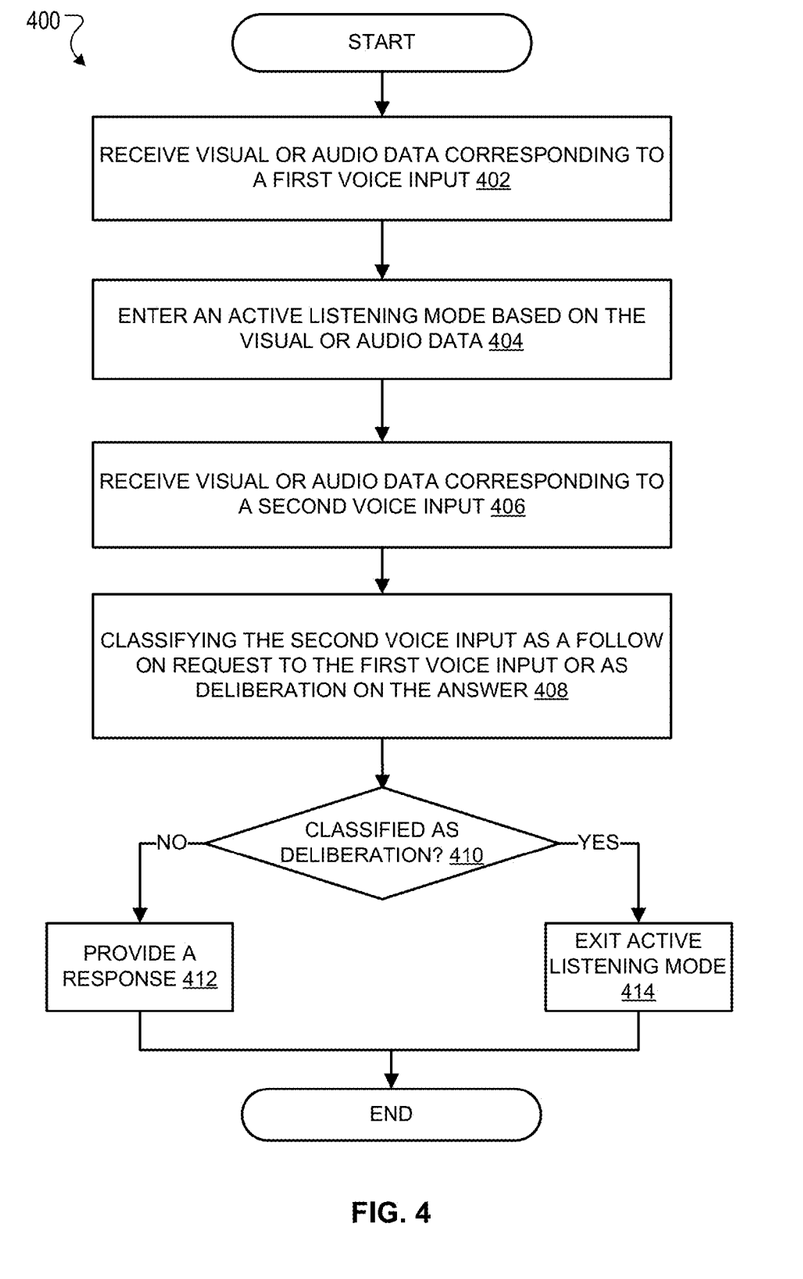
FIG. 4 illustrates an example process for classifying a voice input.

FIG. 4 illustrates an example process 400 for classifying a voice input. The process 400 is described as being performed using system 120 described in FIGS. 1-3. However, other systems or configurations of the system 120 may be used to perform the process 400.

In process 400, the system 120 may receive visual or audio data corresponding to a first voice input (402). For example, the first voice input may be the user 110 speaking, "Hey computer, what is the approval rating of Citizen Kane." The visual data may be data generated by the visual capture device 312 viewing the area including the user 110 and analyzed by the visual analyzer 322. The audio data may be data generated by the audio capture device 310 monitoring sounds in the area and analyzed by the audio analyzer 320. For example, the visual data may indicate that the user 110 is looking at the system 120 and the user's lips are moving, and the audio data may indicate that the user 110 spoke the words, "Hey computer, what is the approval rating of Citizen Kane?"

In the process 400, the system 120 may enter an active listen mode based on the visual or audio data (404). For example, the system 120 may determine based on the received visual or audio data that the user 110 provided an explicit instruction to enter the active listen mode, e.g., speaking the phrase "Hey computer," and enter the active listen mode. The system 120 may make this determination using the utterance classifier 330 and provide a response, e.g., "Citizen Kane has an approval rating of 99%," to the first voice input using response generator 340.

In some implementations, the system 120 may enter the active listen mode even if the user 110 does not provide an explicit instruction. For example, the system 120 may classify a voice input as not deliberation, e.g., meaning the voice input may be a request for the system 120, and enter the active listen mode based on the classification.

In the process 400, the system 120 may receive visual or audio data corresponding to a second voice input (406). For example, the second voice input may be a user 110 speaking, "What do you think of Citizen Kane?" The visual data may indicate that the user 110 is looking away from the system 120 at another person and the user's lips are moving. The audio data may indicate that the user 110 spoke the words, "What do you think of Citizen Kane?"

In the process 400, the system 120 may classify the second voice input as a follow on request to the first voice input or as deliberation on the answer (408). For example, the utterance classifier 330 may classify the second voice input as deliberation on the answer that the system 120 previously provided. The utterance classifier 330 may classify the voice input as deliberation based on that the user 110 was looking away from the system 120 and that the words the user 110 spoke correspond to a question that the system 120 does not typically provide a response.

The process 400 may continue based on if the second voice input was classified as deliberation (410). If the second voice input was not classified as deliberation, in process 400 the system 120 may provide a response to the second voice input (412). The system 120 may provide a response using the response generator 340.

If the second voice input was classified as deliberation, the system 120 may exit the active listen mode (414). In exiting the active listen mode, the system 120 may determine not to respond to the second voice input. In implementations where the system 120 does not use an active listen mode, the system 120 may omit steps (404) and (414) and instead not provide a response to the second voice input.

Even when the system classifies a second voice input as deliberation or is not in an active listen mode, the system 120 may still perform actions based on the second voice input. For example, the system 120 may analyze audio and visual data and store information in a user profile based on the second voice input. In some implementations, the voice input may be a request that is not a question. For example, the voice input may be a request for the system 120 to perform an action, e.g., call a person, make a calendar appointment, cancel a calendar appointment, etc., where the response may be an act of performing the action or a confirmation that the system 120 performed the action.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps may be provided, or steps may be eliminated, from the described processes. Accordingly, other implementations are within the scope of the following claims.

What is claimed is:

1. A computer-implemented method comprising:
providing, by a device that includes an audio capture component that is configured to capture audio data, a video capture component that is configured to capture video data, an automated speech to text recognizer that is configured to transcribe voice inputs, and an automated natural language processing system that is configured to process natural language included in the transcriptions of the voice inputs, an answer to a first voice input from a user;
receiving, by the device, visual or audio data corresponding to a second voice input;
classifying, by the device, the second voice input as a follow on request to the first voice input or as deliberation on the answer, based on the visual data or the audio data, wherein a follow on request comprises an utterance that is directed to the natural language processing system, and wherein deliberation comprises an utterance that is not directed to the natural language processing system and is directed to one or more other people in proximity to the user; and
determining, by the device, whether to provide a response to the second voice input based on the classification of the second voice input.

2. The method of claim 1, further comprising:
receiving visual or audio data corresponding to the first voice input; and
entering an active listen mode based on the visual or audio data corresponding to the first voice input,
wherein determining whether to provide the response to the second voice input comprises:
exiting the entered active listen mode if the second voice input is classified as deliberation.

3. The method of claim 1, further comprising:
determining an angle of the user's head,
wherein classifying the second voice input as a follow on request to the first voice input or deliberation on the answer is based on the determined angle of the user's head.

4. The method of claim 1, further comprising:
determining a number of people in an area that includes the user based on the visual data,
wherein classifying the second voice input as a follow on request to the first voice input or deliberation on the answer is based on the determined number of people.

5. The method of claim 1, further comprising:
determining whether the lips of the user are moving based on the visual data,
wherein classifying the second voice input as a follow on request to the first voice input or deliberation on the answer is based on the determination if lips of the user are moving.

6. The method of claim 1, further comprising:
determining words corresponding to the second voice input based on the audio data,
wherein classifying the second voice input as a follow on request to the first voice input or deliberation on the answer is based on the determined words of the second voice input.

7. The method of claim 1, wherein the response comprises an answer to the second voice input or a reaction to the second voice input perceivable by the user.

8. A system comprising:
one or more computers and one or more storage devices storing instructions that are operable, when executed by the one or more computers, to cause the one or more computers to perform operations comprising:
providing, by a device that includes an audio capture component that is configured to capture audio data, a video capture component that is configured to capture video data, an automated speech to text recognizer that is configured to transcribe voice inputs, and an automated natural language processing system that is configured to process natural language included in the transcriptions of the voice inputs, an answer to a first voice input from a user;

receiving, by the device, visual or audio data corresponding to a second voice input;

classifying, by the device, the second voice input as a follow on request to the first voice input or as deliberation on the answer, based on the visual data or the audio data, wherein a follow on request comprises an utterance that is directed to the natural language processing system, and wherein deliberation comprises an utterance that is not directed to the natural language processing system and is directed to one or more other people in proximity to the user; and determining, by the device, whether to provide a response to the second voice input based on the classification of the second voice input.

9. The system of claim 8, the operations further comprising:

receiving visual or audio data corresponding to the first voice input; and entering an active listen mode based on the visual or audio data corresponding to the first voice input, wherein determining whether to provide the response to the second voice input comprises:

exiting the entered active listen mode if the second voice input is classified as deliberation.

10. The system of claim 8, the operations further comprising:

determining an angle of the user's head, wherein classifying the second voice input as a follow on request to the first voice input or deliberation on the answer is based on the determined angle of the user's head.

11. The system of claim 8, the operations further comprising:

determining a number of people in an area that includes the user based on the visual data, wherein classifying the second voice input as a follow on request to the first voice input or deliberation on the answer is based on the determined number of people.

12. The system of claim 8, the operations further comprising:

determining whether the lips of the user are moving based on the visual data, wherein classifying the second voice input as a follow on request to the first voice input or deliberation on the answer is based on the determination if lips of the user are moving.

13. The system of claim 8, the operations further comprising:

determining words corresponding to the second voice input based on the audio data, wherein classifying the second voice input as a follow on request to the first voice input or deliberation on the answer is based on the determined words of the second voice input.

14. The system of claim 8, wherein the response comprises an answer to the second voice input or a reaction to the second voice input perceivable by the user.

15. A non-transitory computer-readable medium storing software comprising instructions executable by one or more computers which, upon such execution, cause the one or more computers to perform operations comprising:

providing, by a device that includes an audio capture component that is configured to capture audio data, a video capture component that is configured to capture video data, an automated speech to text recognizer that is configured to transcribe voice inputs, and an automated natural language processing system that is configured to process natural language included in the transcriptions of the voice inputs, an answer to a first voice input from a user;

receiving, by the device, visual or audio data corresponding to a second voice input;

classifying, by the device, the second voice input as a follow on request to the first voice input or as deliberation on the answer, based on the visual data or the audio data, wherein a follow on request comprises an utterance that is directed to the natural language processing system, and wherein deliberation comprises an utterance that is not directed to the natural language processing system and is directed to one or more other people in proximity to the user; and determining, by the device, whether to provide a response to the second voice input based on the classification of the second voice input.

16. The medium of claim 15, the operations further comprising:

receiving visual or audio data corresponding to the first voice input; and entering an active listen mode based on the visual or audio data corresponding to the first voice input, wherein determining whether to provide the response to the second voice input comprises:

exiting the entered active listen mode if the second voice input is classified as deliberation.

17. The medium of claim 15, the operations further comprising:

determining an angle of the user's head, wherein classifying the second voice input as a follow on request to the first voice input or deliberation on the answer is based on the determined angle of the user's head.

18. The medium of claim 15, the operations further comprising:

determining a number of people in an area that includes the user based on the visual data, wherein classifying the second voice input as a follow on request to the first voice input or deliberation on the answer is based on the determined number of people.

19. The medium of claim 15, the operations further comprising:

determining whether the lips of the user are moving based on the visual data, wherein classifying the second voice input as a follow on request to the first voice input or deliberation on the answer is based on the determination if lips of the user are moving.

* * * * *